United States Patent [19]

Mannen

[11] Patent Number: 4,742,859

[45] Date of Patent: May 10, 1988

[54] TIRE CHANGER SAFETY APPARATUS AND METHOD

[75] Inventor: Bryce L. Mannen, Conway, Ark.

[73] Assignee: FMC Corporation, Chicago, Ill.

[21] Appl. No.: 938,215

[22] Filed: Dec. 5, 1986

[51] Int. Cl.[4] ............................................. B60C 25/00
[52] U.S. Cl. ......................................... 157/1; 157/14; 157/19; 157/21
[58] Field of Search ........................ 157/1, 1.1, 14, 19, 157/21; 269/130, 131, 132, 239; 224/42.10, 42.26, 42.27, 42.28

[56] References Cited

U.S. PATENT DOCUMENTS

| | | | |
|---|---|---|---|
| 1,256,493 | 2/1918 | West | 224/42.26 |
| 2,661,131 | 12/1953 | Roy | 224/42.26 |
| 3,552,469 | 1/1971 | Corless | 157/1.1 |
| 3,667,320 | 7/1972 | Corless | 157/1.1 |
| 3,675,705 | 7/1972 | Corless | 157/1.1 |
| 3,785,424 | 1/1974 | Rishovd | 157/1.1 |
| 3,805,871 | 4/1974 | Corless | 157/1.1 |
| 4,057,093 | 11/1977 | Joines | 157/1 |
| 4,263,958 | 4/1981 | Corless | 157/1.1 |
| 4,335,772 | 6/1982 | Bubick et al. | 157/1.28 |
| 4,545,573 | 10/1985 | Murphy | 269/131 |

FOREIGN PATENT DOCUMENTS 1524514 9/1978 United Kingdom ............... 157/1

OTHER PUBLICATIONS

Two page brochure, CP/Coats Air-Flate Rim Clamp Tire Changer, RC-10A, date unknown.

*Primary Examiner*—Frederick R. Schmidt
*Assistant Examiner*—Robert Showalter
*Attorney, Agent, or Firm*—Henry M. Stanley; Richard B. Megley

[57] ABSTRACT

A tire changer has the feature of restraining vehicle tire/rim assemblies which are caused to explode due to tire overinflation or tire bead failure for any reason. A tire and rim assembly hold down bar is pivotally attached to one side of the body of the tire changer and is secured in position immediately overlying the tire/rim assembly on the tire changer by engaging a tongue in a buckle assembly mounted on the bar. The tongue is attached to the end of a web belt which is secured to the other side of the body of the tire changer. Engagement of the tongue in the buckle also actuates an enabling valve in a conduit for transmitting tire inflation air from a pressure source to the tire. Inflation air may then be provided at will to the tire by actuation of an inflation valve located in the air conduit between the pressure source and the tire.

26 Claims, 7 Drawing Sheets

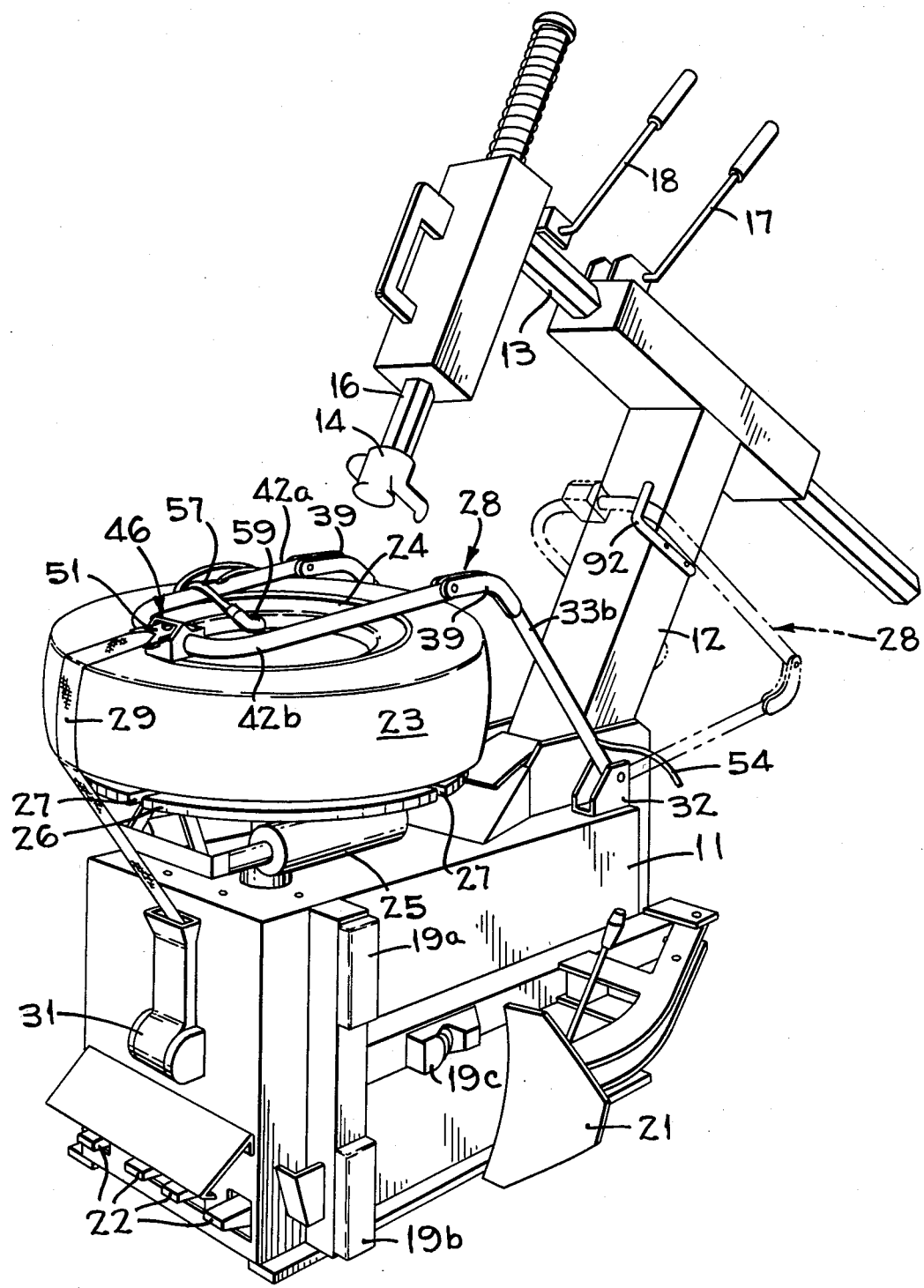
FIG_1

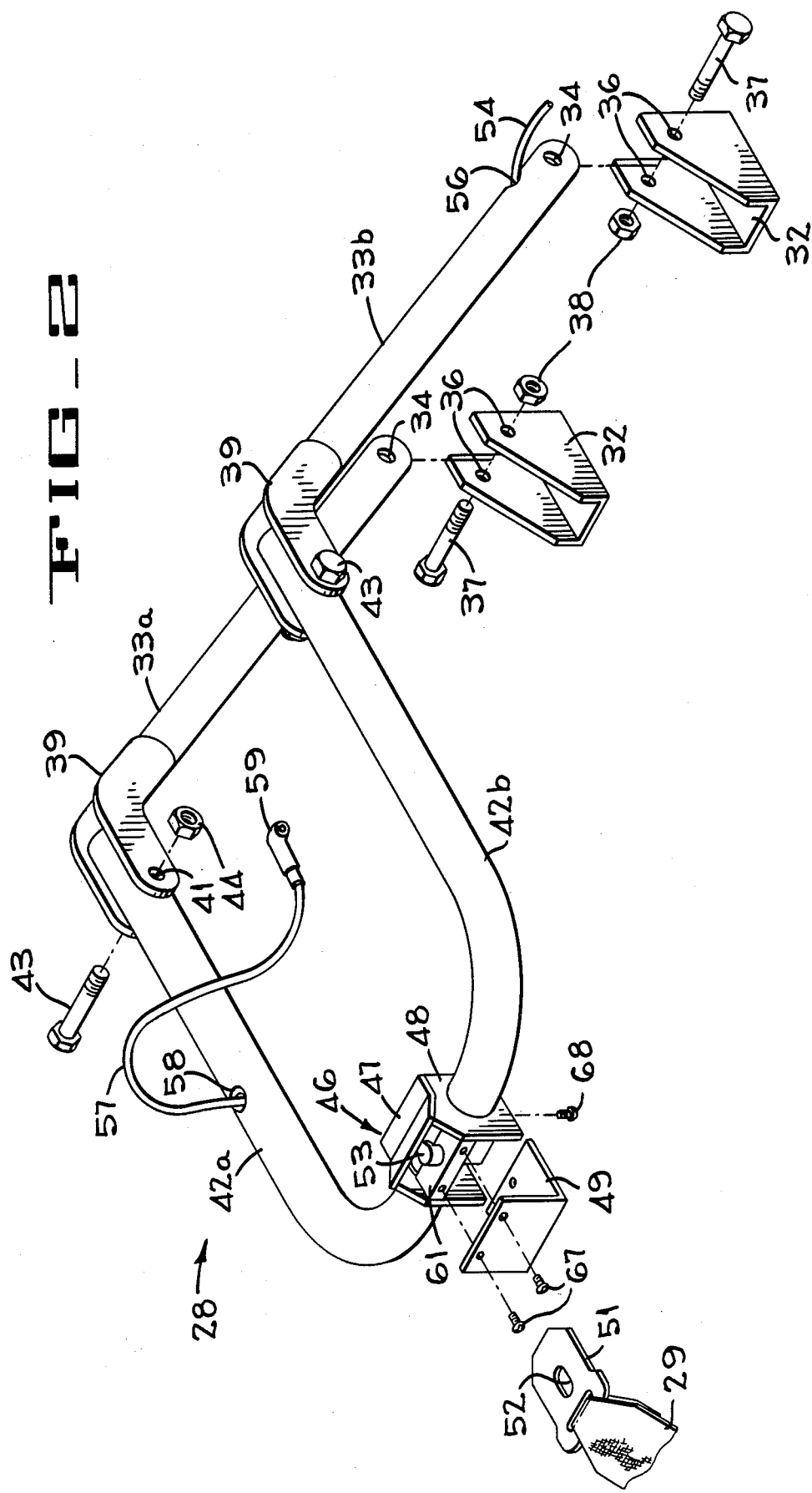
FIG_2

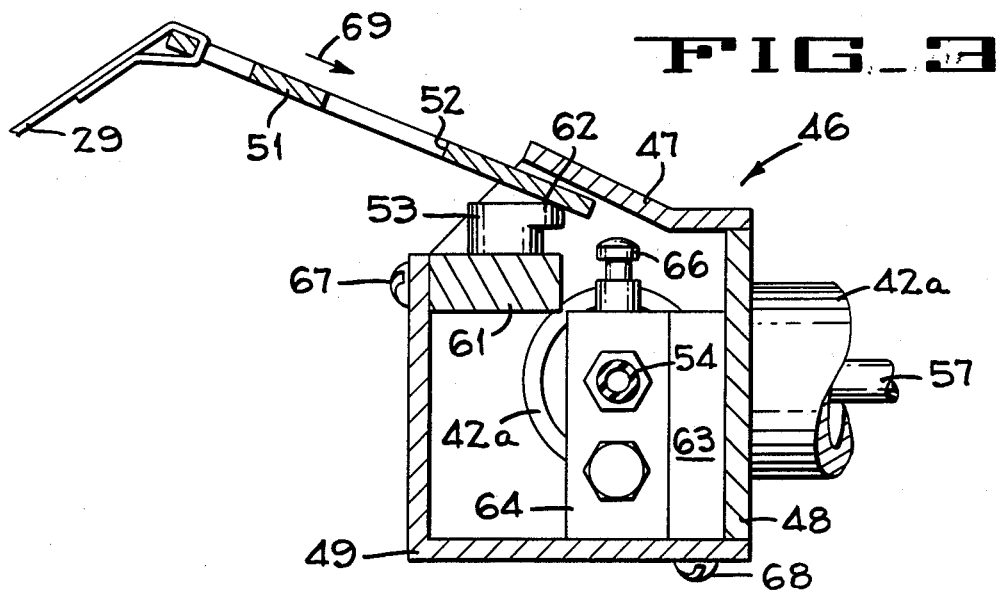
FIG_3A
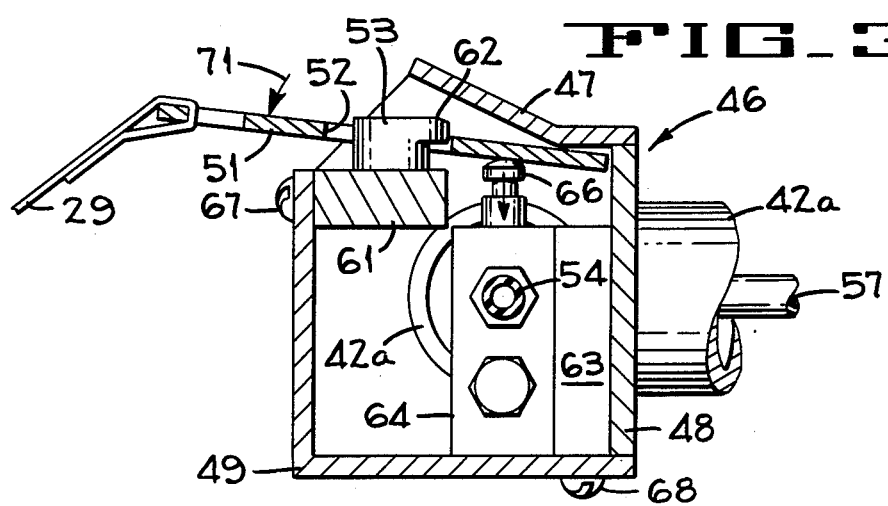
FIG_3B
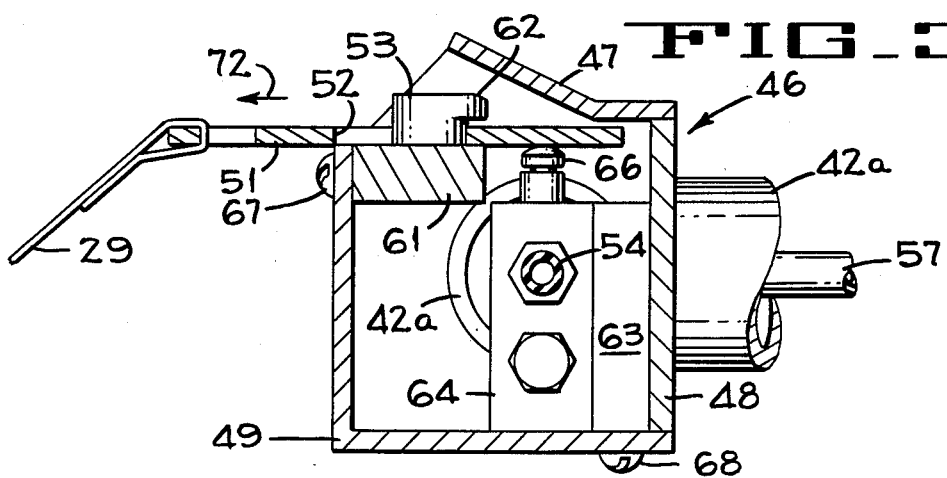
FIG_3C

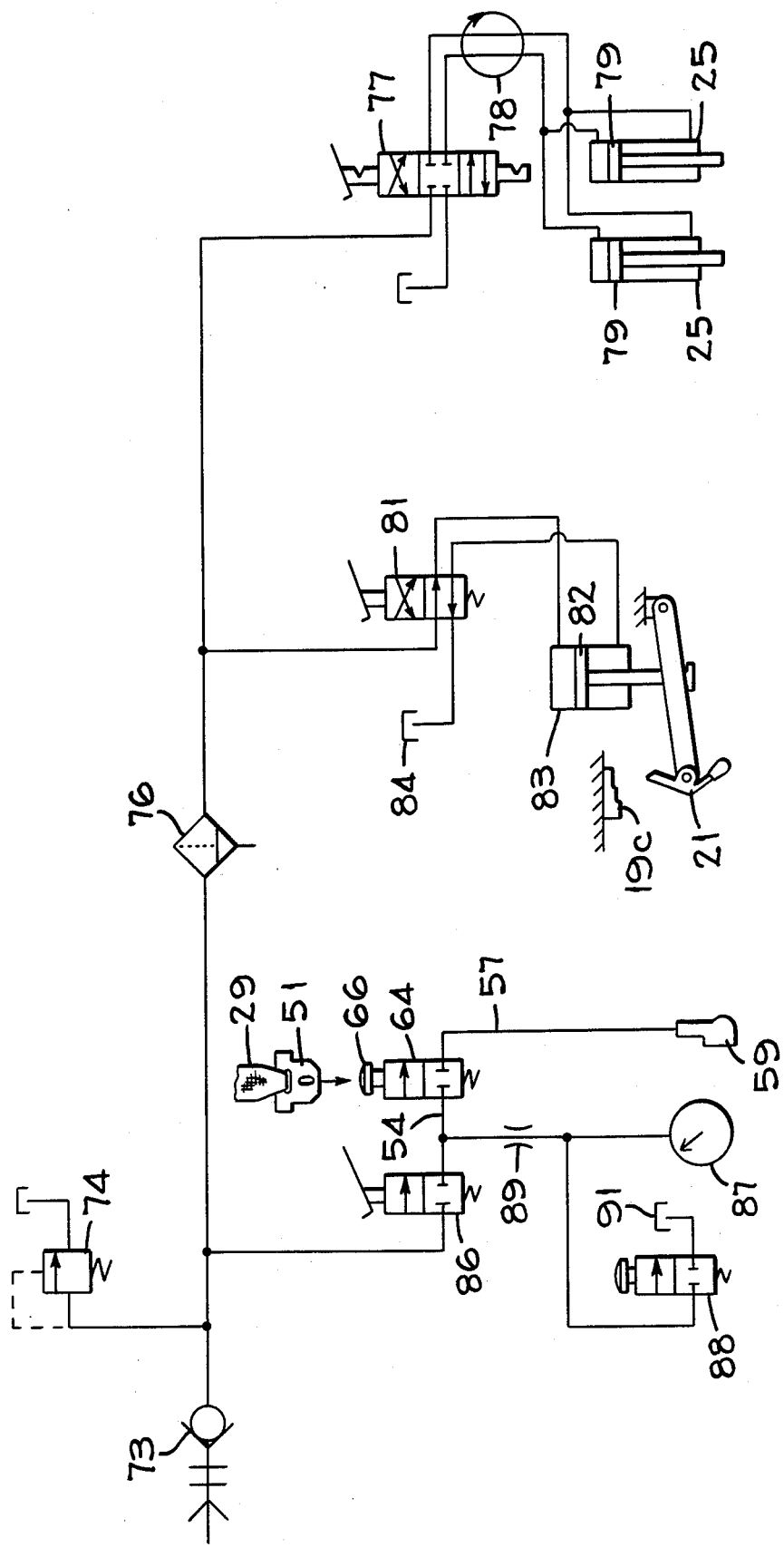
FIG_4

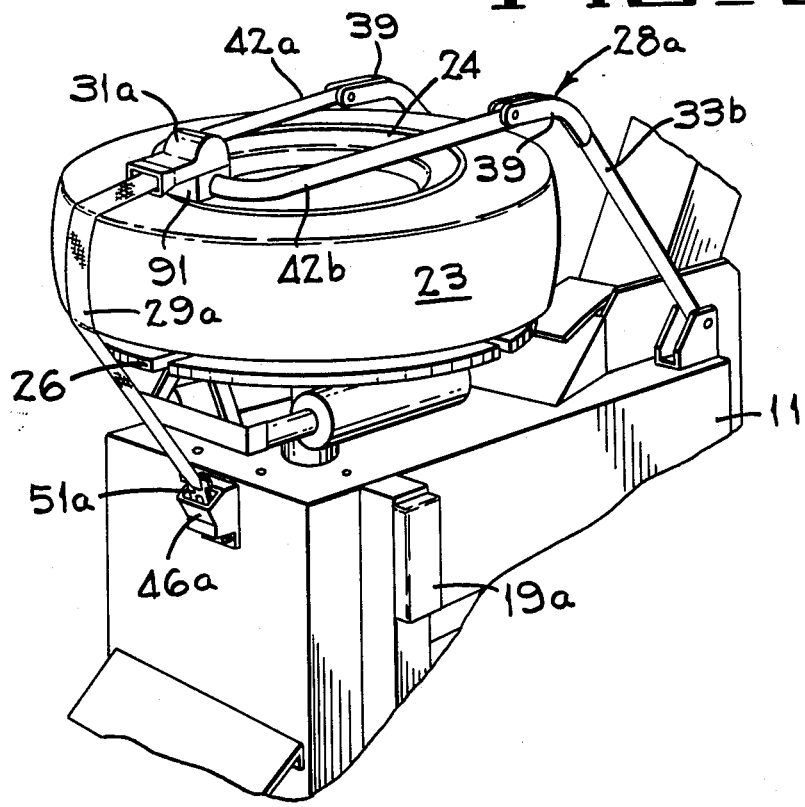
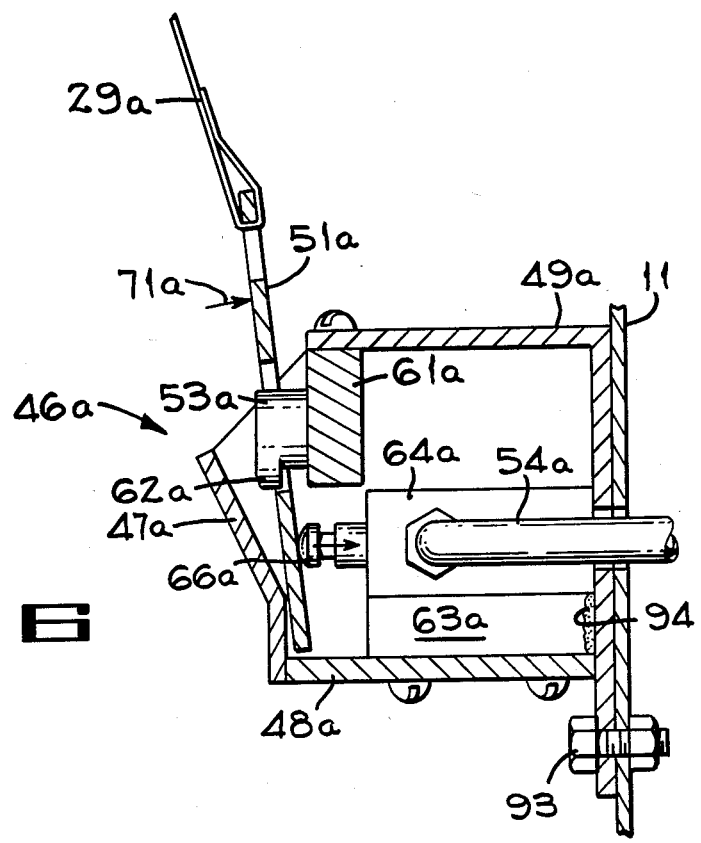

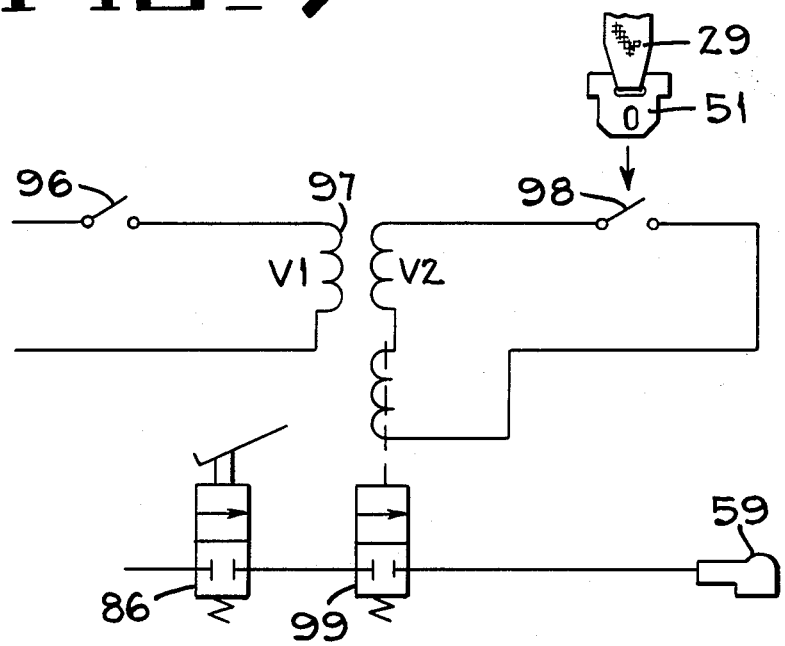
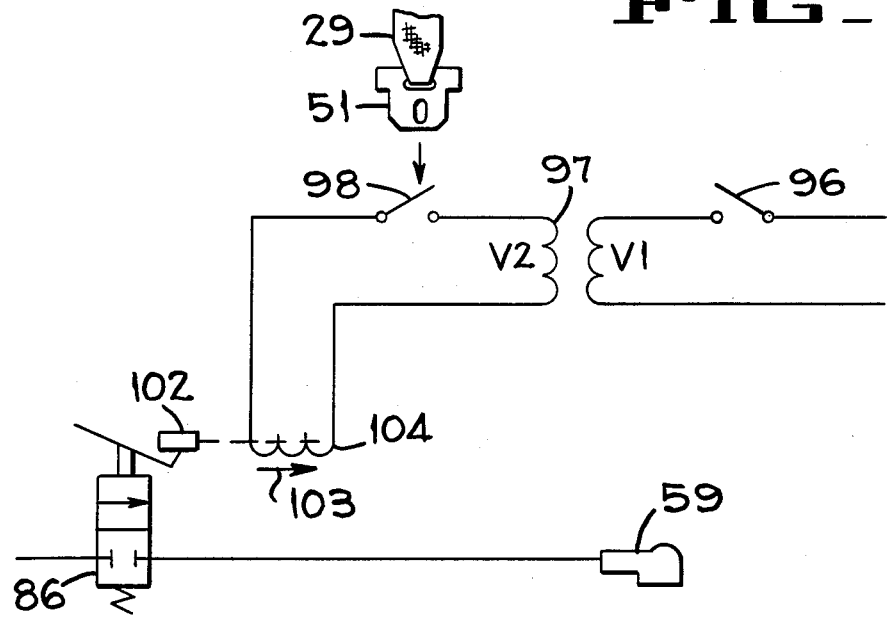

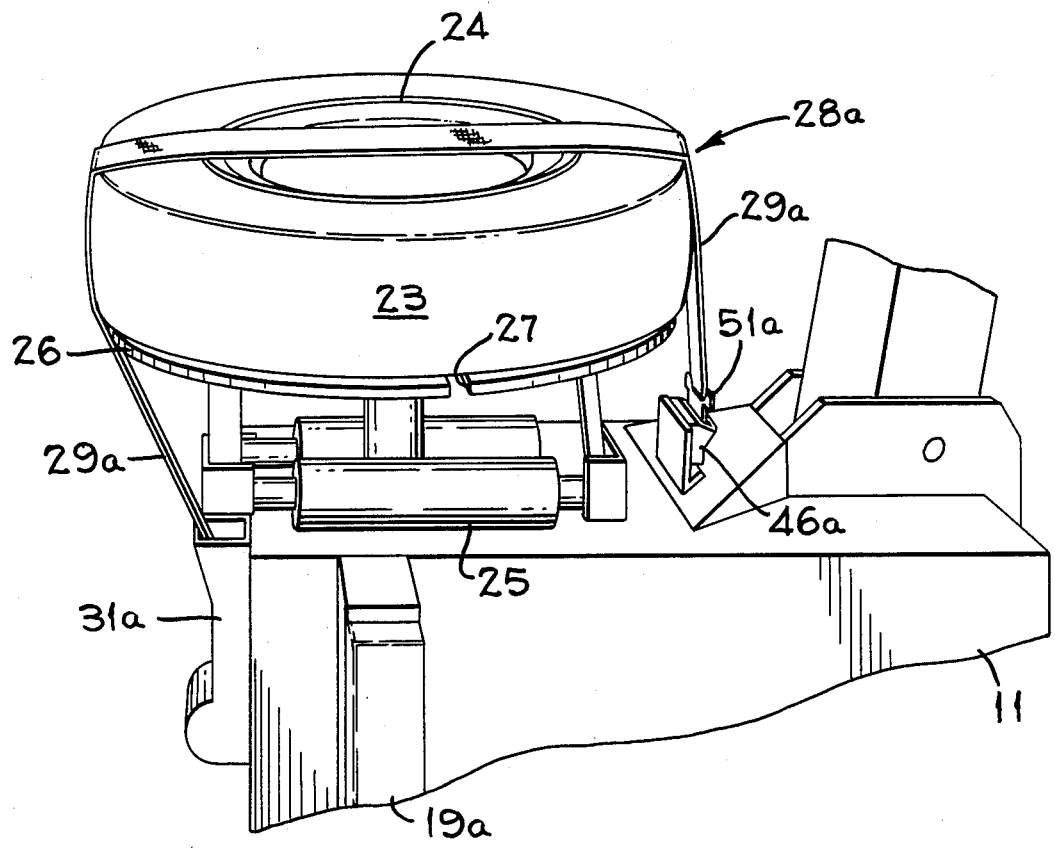

TIRE CHANGER SAFETY APPARATUS AND METHOD

SUMMARY OF THE INVENTION

A safety apparatus is provided for a tire changer having a support base for a tire and rim assembly mounting table. A tire and rim retention means for restraining the tire and rim on the table is attached to opposing sides of the tire changer and is disposable between a position retaining a tire and a rim on the table and a position remote therefrom. Means is provided for fixing the retention means to the support base adjacent one side of the table and means is also provided for detachably connecting the retention means to the support base adjacent the other side of the table. As a result, with the retention means in the retaining position, a tire is retained on the table even if it is overinflated to the point of exploding.

Alternatively a safety means is provided for a tire changer having a tire receiving table mounted on a tire changer support base and an air conduit for conducting tire inflation air. A holding means for restraining a tire-rim assembly on the receiving table is disposed for movement between an engaged position overlying the table and a stowed position removed therefrom. Means is provided for fixing the holding means to the support base proximate to one side of the receiving table, and means is also provided for detachably connecting the holding means to the opposite side of the support base. Valve means is provided for alternatively blocking and opening the air conduit at the valve means when the holding means is in the stowed and the engaged positions respectively.

In the method of the disclosed invention a process of safely inflating a vehicle tire mounted on a vehicle rim on a tire changer machine is provided. A tire mounting table supported above a support base and a conduit delivering inflation air from a pressure source to a vehicle tire situated on the machine is included in the tire changer. The method comprises the steps of placing a rim and an associated uninflated tire on the tire changer table and connecting a physical restraint between opposing sides of the support base and overlying the rim and uninflated tire on the mounting table, thereby securing the rim and the uninflated tire assembly to the table. The inflation air passage in the conduit is enabled by the step of connecting the physical restraint. As a result, inflation air is thereafter deliverable at will through the conduit.

BRIEF DESCRIPTION OF THE DRAWINGS

FIG. 1 is a perspective view of a tire changer utilizing the present invention.

FIG. 2 is a perspective view of the hold down bar of the present invention.

FIGS. 3A–3C depict the engagement of the tongue and buckle and the actuation of the enabling valve of the present invention.

FIG. 4 is a pneumatic schematic of the tire changer of FIG. 1.

FIG. 5 is a partial perspective view of a tire changer utilizing another embodiment of the present invention.

FIG. 6 is a sectional view depicting engagement of the tongue and buckle in the embodiment of FIG. 5.

FIG. 7 is an electrical-pneumatic schematic of another alternative embodiment of the present invention.

FIG. 8 is an electrical schematic of yet another embodiment of the present invention.

FIG. 9 is a partial perspective view of a tire change utilizing yet another embodiment of the present invention.

DESCRIPTION OF THE PREFERRED EMBODIMENTS

The invention disclosed herein will be described primarily in conjunction with a rotating table type tire changer for mounting and demounting tires onto and from vehicle wheel rims. The apparatus and method described herein is also useful on a tire changer having a stationary table for receiving the rim of a vehicle wheel. A tire changer of the first mentioned type is shown in FIG. 1 having a base shown generally at 11 with a tower 12 mounted at one end of the base. The tower is disposed to rock into the position shown in FIG. 1 as well as into a position where the tower is in a substantially vertical position. An arm 13 is disposed to slide through an upper portion of the tower 12 to dispose a tire mount-demount head 14 in a position overlying the junction of a vehicle wheel rim and a tire bead when the tower 12 is in the substantially vertical position. A vertical adjust arm 16 is adjustable to place the mount-demount head in proper position relative to the tire bead and the wheel rim to mount or demount the tire therefrom as desired. The horizontal and vertical adjust arms 13 and 16 are capable of being locked in position by means of locking mechanisms actuated by locking handles 17 and 18. Actuation of the locking handles spaces the mount-demount head 14 appropriately from the vehicle rim to avoid damage to the rim as is well known in the art.

The base 11 has appropriate support blocks 19a, 19b and 19c against which a wheel rim and tire assembly may be placed for support while a tire bead is broken away from the wheel rim by a bead breaker shoe 21. The bead breaker is actuated pneumatically in a manenr well known in this art to move away and toward the base 11, thereby being useful in separating the bead of a tire from the rim of a wheel supported against the blocks 19a, b and c. A group of foot pedals shown generally at 22 are disposed at the lower end of the base 11 opposite from the side of the base supporting the tower 12 for actuation by an operator to perform the functions carried out by the tire changer.

A tire 23 is shown disposed on a rim 24 lying on top of a rotating table 26 in the tire changer of FIG. 1. The table is rotated by means of an electrical motor and interconnecting gearing (not shown) which is known in this art and is supported within the base 11. The table in this type of tire changer has a number (in most cases 4) of radially moving jaws which are disposed to move in grooves 27 shown intercepting the edge of the table 26 to clamp either the inside or the outside of the rim 24. The jaws on the tire changer of FIG. 1 are caused to move radially by actuation of two pneumatic cylinders 25 positioned beneath the table 26 and above the base 11 which, through a system of simple levers, cause the jaws to undergo their aforedescribed radial movement. In this known manner the tire 23 and rim 24 assembly is firmly positioned on top of the table 26. However, in a tire changer where the wheel and rim assembly is captured to prevent radial motion on a tire changer table, motion of the tire and wheel assembly, or parts thereof, axially away from the table is not restrained to any appreciable degree. Therefore, if a tire mounted on the table is overinflated to the point of explosion, the tire rim assembly will move violently upward off of the table 26 endangering any persons situated in the near vicinity.

The manner in which the violent movement of an exploding tire and rim assembly may be arrested involves placing a member such as a hold-down or pivoted tube assembly shown generally at 28 in FIG. 1 in a position overlying the tire and rim assembly on the table. Some means such as a webbed belt 29 extending from an inertia reel 31 attached to the base 11 shown in FIG. 1 must be provided for holding the assembly 28 in a position overlying the wheel and tire assembly. The webbed belt 29 and the hold-down assembly 28 are securely joined in a manner to be hereinafter described.

With reference now to FIG. 2 of the drawings the hold-down or pivoted tube assembly 28 is shown with details regarding its attachment to the base 11 of the tire changer as well as other details of construction of one suitable type of hold-down or restraining apparatus. Two strong steel brackets 32 are fixed to the upper reaches of the base 11. A pair of strong straight metal tubes 33a and 33b are fashioned with a hole 34 in one end. Holes 36 are fashioned in the upwardly extending flanges of the brackets 32. When the holes 34 are aligned with the holes 36 in the brackets 32 and a bolt 37 is passed therethrough, a pivot is formed between the brackets and the straight tube sections. The bolts 37 are held in place by nuts 38.

A pair of angled arms 39 are securely fixed to the ends of the straight tubes 33 opposite the end through which the holes 34 are formed. The other end of the arms 39 have aligned holes 41 formed therethrough. A pair of "J" shaped tube sections 42a and 42b have holes formed therethrough which, when aligned with the holes 41 in the arms 39, will receive a pivot bolt 43 secured in place by a nut 44 so that the "J" shaped tube sections may pivot relative to the arms 39 and therefore relative to the straight tube sections 33a and 33b. The "J" shaped tube sections are positioned so that their curved ends approach one another and are both engaged in opposite sides of a buckle assembly 46. The buckle assembly has a top cover 47, a housing 48 and a bottom cover 49. The webbed belt 29 has a tongue 51 securely fixed to the end thereof which is shaped to enter the buckle assembly 46 in a manner to be hereinafter described. The tongue 51 has an elongate hole 52 which is disposed to receive a stud 53 in the buckle assembly 46 when the tongue is in locked engagement with the buckle assembly.

FIG. 2 also shows a pressure portion of pneumatic hose 54 entering the straight tube portion 33b through a hole 56 near the pivoted end thereof. The pressure hose portion extends through the straight tube section 33b and through the "J" shaped tube section 42b into the buckle assembly 46. An additional portion 57 of pneumatic hose extends from the other side of the buckle assembly 46 through the interior of the opposite "J" shaped tube 42a, exiting therefrom through a hole 58 as shown in FIG. 2. The additional hose portion 57 has attached at the free end thereof an air chuck 59 which is adapted to mate with the inflation valves on tire-rim assemblies 23–24.

FIGS. 3A through 3C show the internal construction of the buckle assembly 46 and the manner in which the pneumatic tubes 54 and 57 enter and exit therefrom respectively. A safety stud mounting plate 61 is fixed between the opposing walls of the housing 48 by means of welding for example. The safety stud 53 is mounted centrally on the plate 61 also by some means such as welding. The safety stud has an overhanging lip 62 extending toward the interior of the buckle assembly 46. The top of the saftety stud and the overhanging lip are of such a size in the direction of the extended lip to pass through the long dimension of the elongate hole 52 in the tongue 51. The stud in its width dimension is of a size such as to pass through the width of the elongate hole 52, but with less clearance.

A valve mount plate 63 is fixed, as by welding, to the rear surface of the buckle housing 48. A pneumatic valve 64 is mounted to the plate by any convenient means such as screws, so that the pressure section 54 of pneumatic hose enters the valve from the "J" shaped tube section 42b (FIG. 2). The additional section 57 of pneumatic hose exits the opposite side of the pneumatic valve 64 extending into the "J" shaped tube section 42a. The pneumatic valve is actuated by a button 66 extending from the top thereof. The button 66 is spring loaded to a position blocking flow of air through the valve. It may be seen in FIGS. 3A–3C that the "L" shaped bottom cover 49 is secured to the buckle assembly 46 by means of screws 67 engaging holes threaded in the safety stud mounting plate and a screw 68 engaging a threaded hole formed in the bottom of the valve mounting plate 63.

It may also be seen by reference to the FIGS. 3A–3C that positioning the tongue 51 into the buckling assembly 46 in accordance with the direction of the arrow 69 as shown in FIG. 3A, that the tongue passes over the top of safety stud 53 and underneath the angled top cover 47 on the buckle assembly. When the tongue 51 is inserted the full distance into the buckle assembly, the tongue is depressed as shown by the arrow 71 in FIG. 3B so that it falls below the lip 62 on the safety stud. Subsequently the tongue 51 is moved in the direction of the arrow 72 seen in FIG. 3C to place the edge of the hole 52 in a position underlying the lip 62 on the safety stud. Consequently, the tongue is inserted (arrow 69), engaged (arrow 71), and locked (arrow 72) by the serial steps depicted in FIGS. 3A, 3B and 3C.

It should be noted that the inertia reel 31 and belt assembly 29 may be obtained from the Beams Manufacturing Division, 2600 West Main, Oklahoma City, Okla., in accordance with that vendor's Part Number FW-01. The webbed belt 29 length as used is appropriately five feet and the belt tensile strength is in excess of 2500 pounds. The emergency locking retractor is an inertia reel type device and the aforementioned vendor part number includes both the reel and the length of webbed belt.

By way of clarifying the operation of the tire changer of FIG. 1, reference is made to the pneumatic schematic of FIG. 4. Pressure air is introduced into the pneumatic system contained within and around the base 11 through a quick-connect coupler 73. A relief valve 74 is depicted near the pneumatic system inlet and is set to relieve the system at 200 psi for this particular application. The pneumatic line extends through a water separator and filter 76 and is connected to a rim clamp jaw actuator valve 77 which is actuated by one of the foot pedals in the array 22 shown in FIG. 1. Valve 77 is a two way valve which, when actuated in one direction or the other, passes pressure air through a rotary air coupler 78 to one side or the other of a pair of pistons 79 in the jaw actuator cylinders 25. As mentioned before, travel of the piston 79 in one direction within the cylinders 25 cause the wheel rim clamps to travel in one radial direction in the grooves 27 on the table 26 and movement of the pistons 79 in the opposite direction causes the wheel rim clamp members to move in the opposite radial direction on the table 26. The bidirectional valve 77 is therefore utilized to cause the wheel rim gripping jaws to extend radially outward in one direction of actuation and radially inward in the other direction.

Also depicted in the pneumatic schematic of FIG. 4 is the path of pressurized air through a valve 81, actuated also by a foot pedal in the array 22 of FIG. 1. This valve directs air toward one side or the other of a piston 82 in a cylinder 83 enclosed within the base 11 of the tire changer. The position of the valve 81 as shown in FIG. 4 may be seen to drive the piston 82 outwardly away from the base 11 and therefore to carry the bead breaker shoe 21 away also. Actuation of the foot pedal placing valve 81 in the alternate position will drive the piston 82 upwardly in cylinder 83 as seen in FIG. 4, thereby causing the bead breaker shoe 21 to approach the block 19c to thereby bear against and break a bead from a vehicle rim. Pressure is exhausted from the nonpressurized side of the piston 82 through a vent 84.

Also with reference to FIG. 4, the tongue 51 secured to the end of the webbed belt 29 is used to actuate the valve 64 from a closed position to an open position by depressing the button 66 on the valve as shown in FIGS. 3A–3C. Valve 64 when opened may be seen to enable the air path from the pressure source to the air chuck 59. With the air conduit to the air chuck 59 enabled, actuation of the appropriate foot pedal in the array 22 (FIG. 1) will actuate an inflater valve 86 causing pressurized air to flow from the air pressure source through valves 86 and 64 up to the air chuck 59, which allows pressure air to enter the tire being inflated on the table 26 of the tire changer. An air pressure gauge 87 is provided to monitor the air pressure at the air chuck 59, and therefore within the tire being inflated. A pressure air bleeder valve 88 is provided in the system, wherein both the bleeder valve and the pressure gauge are supplied through a restricted passage 89 for pneumatic purposes. The bleeder valve exhausts air pressure to a vent 91. The pressure gauge has been found to be satisfactory for this application if it has a 0 to 60 pounds per square inch scale.

It should be apparent from the foregoing that the apparatus described is appropriate for practicing the process of safely inflating a vehicle tire on a vehicle rim while the tire and rim are mounted on a table on a tire changing machine. The machine has a conduit for delivering inflation air from a pressure source to the vehicle tire as set forth in the description of FIG. 4 herein. The process involves placing a rim and an associated uninflated tire on the tire changer table and securing the rim and uninflated tire assembly to prevent any substantial axial movement of the tire and rim assembly relative to the table. The process also involves the enabling of inflation air flow in the inflation air conduit simultaneously with the securing of the rim against axial movement. As a result inflation air may thereafter be delivered through the air chuck to the interior of the tire without running the risk of property damage or personal injury should the tire be overinflated or should the tire bead explode from the tire rim for any other reason such as a faulty tire bead, for example.

As mentioned initially in the foregoing disclosure, many tire changers in use today have stationary tables which receive rims thereon. Tire beads are broken while on the stationary receiving tables and tires are both mounted and demounted while the rim is on the stationary table in a fashion which is widely known in the tire changing industry. However, with such tire changers a centrally located threaded post generally extends upwardly from the mounting table and receives some sort of cone nut on the threads for the purpose of clamping the rim and tire assembly in position on the stationary table to prevent axial motion between the table and the tire and rim assembly. The invention disclosed herein including wheel retention means abutted against a rim and tire assembly mounted on the table and locked in place is visualized as an alternative safety apparatus for stationary table type tire changers. Some means such as the buckle assembly 46 and the tongue 51, belt 29 and reel 31 assembly may be used for releasably locking the wheel retention means in position abutting the tire and rim assembly. A normally closed valve is actuated to an open position by the engagement of the releasable locking means and the abutted wheel retention means. In this fashion the normal inflation conduit for the tire changer is enabled by actuation of the normally closed valve and inflation air may be delivered to the mounted tire through the air chuck 59 by subsequent actuation of inflation air control valve 86, by one of the foot pedals in the array 22 of FIG. 1.

When the inflation safety apparatus is not in use, it is pivoted about the pivot bolts 37 (FIG. 2) to the position seen in FIG. 1 in phantom lines and brought to rest on a hanger hook 92 attached to the side of the tower 12. Thus, the pivoted tube assembly 28 may be moved between a position overlying a tire and rim assembly mount table (FIG. 1 solid lines) and a position where the tube assembly is in an out of the way or stowed position (FIG. 1 phantom lines). Said alternatively, the vehicle wheel assembly hold-down apparatus may be positioned in abutting contact with a wheel rim and tire assembly to prevent axial movement of the wheel and tire assembly, or it may be positioned in a remote, out of the way position until it is necessary to inflate a tire newly mounted on a rim 24. It may be seen from the foregoing that the tire may not be inflated until the pivoted tube assembly 28 is so positioned nor until the buckle 51 at the end of the belt 29 is properly inserted and locked in the buckle assembly 46 as shown in Figures 3A, 3B and 3C. There is therefore no possibility for an untrained operator to overinflate a tire on a rim to the point of explosion, injury and damage without having the disclosed safety device firmly locked in place to restrain any axial tire and rim movement from whatever cause.

In FIG. 5 a hold-down assembly 28a is shown which differs slightly from the hold-down assembly 28 seen in FIGS. 1 and 3. The two hold-down assemblies have the same metal tubes 33a and 33b, angled arms 39, and the two "J" shaped tube sections 42a and 42b in common. The common parts are joined similarly in both embodiments of the hold-down assembly. However, the embodiment of FIG. 5 does not have the buckle assembly 46 at the confluence of the two "J" shaped tube sections. In pace of the buckle is a metal member 91 to which the ends of the "J" shaped tube sections remote from the angled arms 39 are fastened as by welding, for example. There is an upper mounting surface on the metal member 91 to which is attached an inertia reel assembly 31a, similar in most respects to the reel 31 hereinbefore described. Extending from the reel 31a is a webbed belt 29a, similar to the belt 29 described in conjunction with the embodiment of FIG. 1. A buckle assembly 46a is shown mounted in fixed position on the base 11 of the tire changer in FIG. 5. It may be seen that the hold-down assembly 28a of FIG. 5 is pivotally attached at one end to the tire changer base 11, and has a free end to which is attached the inertia reel 31a having the webbed belt 29a extending therefrom. The webbed belt 29a has a free end which is releasably engaged in the buckle 46a.

The manner in which the free end of the webbed belt 29a is engaged within the buckle 46a of FIG. 5 is described with reference to FIG. 6 of the drawings. The buckle assembly has a top cover 47a, housing 48a and a bottom cover 49a. The bottom cover 49a has an extension passing beyond the housing 48a which is used as a mounting flange so that the buckle assembly 46a may be securely fastened to the base 11 of the tire changer by means of bolts 93, for example.

FIG. 6 also shows a pneumatic hose 54a entering the buckle assembly 46a from the interior of the tire changer. An additional portion 57a of pneumatic hose extending back into the interior of the tire changer is not shown in FIG. 6. The pneumatic hose portion 54a is connected to a pneumatic valve 64a which is mounted on a valve mounting plate 63a welded to the bottom cover 49a as shown at 94. The housing 48a is secured to the other side of the valve mounting plate 63a.

A safety stud mounting plate 61a is fixed between the opposing walls of the housing 48a by means of welding, for example. A safety stud 53a is mounted centrally on the plate 61a also by some means such as welding. The safety stud has an overhanging lip 62a extending downwardly in the buckle assembly 46a of FIG. 6.

The webbed belt 29a has a tongue 51a fixed thereto which is configured precisely the same as the tongue 51 in the embodiment of FIGS. 2 and 3A–3C. The top of the safety stud 53a and the overhanging lip 62a are of such a size in the direction of the extended lip to pass through the long dimension of the elongate hole 52 in the tongue 51a. The stud in its width dimension is of a size such as to pass through the width of the elongate hole 52, but with less clearance. The pneumatic valve is actuated by a button 66a extending from one side thereof. The button 66a is spring loaded to a position blocking flow of air through the valve 64a. It may be seen that when the tongue 51a is inserted the full distance into the buckle assembly 46a, and the tongue is moved in the direction of the arrow 71 in FIG. 6, that the tongue is captured within the buckle assembly 46a in the same fashion as described for capture of the tongue 51 within the buckle assembly 46 hereinbefore. It is apparent from the foregoing that the hold-down apparatus could consist entirely of a properly configured hold-down assembly 28a having a free end adapted to be engaged by the buckle assembly 46a, or it could take the form of an inertia reel 31a attached to one side of the tire changer and having a webbed belt 29a extending therefrom to engage a mechanism such as the buckle assembly 46a mounted on the other side of the tire as seen in FIG. 9 changer. In either event, a hold-down apparatus would be provided which would prevent a tire and rim assembly (23–24) from moving axially in relation to the tire mounting table 26.

Turning now to FIG. 7, an alternative embodiment of the safety apparatus of the present invention is described. In the electrical-pneumatic schematic of FIG. 7 electrical power available to operate the tire changer is provided through an on-off switch 96 to a step down transformer 97. Typical power to operate the tire changer may be multiphase or single phase. At any rate a voltage V1, such as 110 volts is stepped down to a voltage V2, such as 12 or 16 volts. When the hold-down apparatus locking mechanism is engaged, such as by insertion of the tongue 51 into the buckle 46, a normally opened microswitch 98 is moved to a closed position. A solenoid actuated valve 99 functions pneumatically the same as valve 64 hereinbefore described. In the embodiment of FIG. 7 when the microswitch 98 is closed, valve 99 is enabled to allow passage of tire inflation air to the air chuck 59. Consequently, actuation of the control lever associated with the inflation valve 86 by an operator delivers tire inflation air through the air chuck 59.

With reference now to FIG. 8 of the drawings, an additional embodiment of the present invention is depicted. The on-off switch 96 delivers power to the step down transformer 97 to convert voltage V1 to voltage V2 as explained in conjunction with the embodiment of FIG. 7. Also in a manner similar to the embodiment of FIG. 7, a member, such as the tongue 51, is engaged within a locking means such as the buckle assembly 46, which closes a normally open microswitch 98. A locking member 102 is movable in the direction of an arrow 103 when microswitch 98 is closed. Switch closure energizes a solenoid 104. Prior to energizing the solenoid, the locking member 102 is in a position to lock any movement of an operator accessible control for air inflation valve 86 as shown in FIG. 8. Upon closing microswitch 98 and energizing the solenoid, the locking member 102 is caused to move in the direction of the arrow 103, thus leaving the operator accessible control for air inflation valve 86 free to be moved to actuate valve 86. Tire inflation air is therefore passed through valve 86 and up to and through air chuck 59. Air inflation valve 86 may be seen to be normally closed and locked in the closed position until microswitch 98 is closed by engagement of the locking mechanism for the tire and rim assembly hold-down means on the tire changer.

Although the best mode contemplated for carrying out the present invention has been herein shown and described, it will be apparent that modification and variation may be made without departing from what may be regarded to be the subject matter of the invention.

What is claimed is:

1. Safety means on a tire changer having a tire receiving table mounted on a tire changer support base and an air conduit for conducting tire inflation air, comprising holding means for restraining a tire-rim assembly on the tire receiving table, means for fixing said holding means to the support base proximate one side of the tire receiving table, means for detachably connecting said holding means to the opposite side of the support base, whereby said holding means is disposed for movement between an engaged position overlying the table and a stowed position removed therefrom, and valve means for alternatively blocking and opening the air conduit at said valve means when said holding means is in said stowed and engaged positions respectively, wherein said holding means comprises an arm having one free end and a fixed end, said means for fixing comprising means for pivotally attaching said fixed end to the tire changer support base, and said means for detachably connecting comprising means for releasably engaging said free end in said engaged position, wherein said means for releasably engaging comprises means for actuating said valve means to an open position.

2. Safety means on a tire changer having a tire receiving table and an air conduit for conducting tire inflation air, comprising holding means disposed for movement between an engaged position overlying the table and a stowed position removed therefrom, and valve means for alternatively blocking and opening the air conduit at said valve means when said holding means is in said stowed and engaged positions respectively, said holding means further comprising an arm having one free end and a fixed end pivotally attached to the tire changer, and means for engaging said free end in said engaged position, said means for engaging further comprising means for actuating said valve means to an open position, wherein said means for actuating comprises a buckle, and a tongue adapted for insertion into and releasable retention within said buckle, and wherein said valve means comprises a valve mounted on said buckle and an actuating member extending therefrom disposed to be contacted by said tongue.

3. Safety means on a tire changer having a tire receiving table mounted on a tire changer support base and an air conduit for conducting tire inflation air, comprising holding means for restraining a tire-rim assembly on the tire receiving table, means for fixing said holding means to the support base proximate one side of the tire receiving table, means for detachably connecting said holding means to the opposite side of the support base, whereby said holding means is disposed for movement between an engaged position overlying the table and a stowed position removed therefrom, and valve means for alternatively blocking and opening the air conduit at said valve means when said holding means is in said stowed and engaged positions respectively, wherein said holding means comprises a rigid arm, wherein said means for fixing comprises means for pivotally attaching said arm to the tire changer at one end, said arm having a free end disposed for positioning between said stowed and engaged positions, and wherein said means for detachably connecting comprises a belt attached at one end to the tire changer support base and having a free end, and releasable locking means adapted to couple said rigid arm free end with said belt free end.

4. Safety means on a tire changer having a tire receiving table and an air conduit for conducting tire inflation arm, comprising holding means disposed for movement between an engaged position overlying the table and a stowed position removed therefrom, and valve means for alternatively blocking and opening the air conduit at said valve means when said holding means is in said stowed and engaged positions respectively, wherein said holding means comprises a rigid arm pivotally attached to the tire changer at one end and having a free end disposed for positioning between said stowed and engaged positions, a belt attached at one end to the tire changer and having a free end, and releasable locking means adapted to couple said rigid arm free end with said belt free end, wherein said valve means is mounted in said locking means and is actuated to pass the tire inflation air when said belt is coupled to said rigid arm.

5. Safety means on a tire changer having a tire receiving table mounted on a tire changer support base and an air conduit for conducting tire inflation air, comprising holding means for restraining a tire-rim assembly on the tire receiving table, means for fixing said holding means to the support base proximate one side of the tire receiving table, means for detachably connecting said holding means to the opposite side of the support base, whereby said holding means is disposed for movement between an engaged position overlying the table and a stowed position removed therefrom, and valve means for alternatively blocking and opening the air conduit at said valve means when said holding means is in said stowed and engaged positions respectively, wherein said holding means comprises a rigid arm, wherein said means for fixing comprises means for pivotally attaching said arm to the tire changer at one end, said arm having a free end disposed for positioning between said stowed and engaged positions, and wherein said means for detachably connecting comprises a belt attached at one end of said free end of said rigid arm and having a belt free end, and releasable locking means mounted on the tire changer support base adapted to couple with said belt free end.

6. Safety means on a tire changer having a tire receiving table and an air conduit for conducting tire inflation air, comprising holding means disposed for movement between an engaged position overlying the table and a stowed position removed therefrom, and valve means for alternatively blocking and opening the air conduit at said valve means when said holding means is in said stowed and engaged positions respectively, wherein said holding means comprises a rigid arm pivotally attached to the tire changer at one end and having a free end disposed for positioning between said stowed and engaged positions, a belt attached at one end to said free end of said rigid arm and having a belt free end, and releasable locking means moutned on the tire changer adapted to couple with said belt free end, and wherein said valve means is mounted in said locking means and is enabled to pass the tire inflation air when said belt is coupled therewith.

7. Safety means as in claim 3 wherein said valve means comprises a solenoid valve, and a switch electrically coupled with said solenoid valve, said holding means in said engaged position operating to actuate said switch to open said solenoid valve.

8. Safety means as in claim 3 wherein said means for actuating comprises
a buckle, and
a tongue releasably retained in said buckle, and wherein said valve means comprises
a solenoid valve, and
switch means electrically coupled to said solenoid valve.

9. Safety means on a tire changer having a support base for supporting a table for receiving a tire and rim assembly, comprising tire and rim retention means for restraining the tire and rim assembly on the table,
means for fixing said retention means to the support base adjacent one side of the table,
means for detachably connecting said retention means to the support base adjacent the other side of the table, whereby said restraining means is attached to opposing sides of the tire changer disposable between a position retaining a tire and rim on the table and a position remote therefrom, and a tire and rim assembly will be retained on the table if it is overinflated to the point of explosion,
wherein said tire and rim retention means comprises a rigid arm, said means for fixing comprising means for pivotally attaching said rigid arm at one end to one side of the tire changer support base, said rigid arm having a free end, and
wherein said means for detachably connecting comprises
a belt attached to the other side of the tire changer support base and having a free end, and
releasable locking means for coupling said free ends of said rigid arm and belt when in said retaining position.

10. Safety means on a tire changer having a table for receiving a tire and rim assembly, comprising tire and rim retention means attached to the tire changer disposed between a position retaining a tire and rim on the table and a position remote therefrom, whereby a tire and rim assembly will be retained on the table if it is overinflated to the point of explosion, wherein the tire changer includes an air conduit delivering air under pressure to an air chuck for tire inflation, comprising valve means connected in the air conduit actuable between a closed and open condition, said retention means comprising means for actuating said valve means to said open condition when said retention means is in said retaining position, and
wherein said valve means comprises accessible valve actuator means, and said retention means comprises a first retaining member, a second retaining member and a buckle housing attached to said second retaining member, said means for actuating comprising a tongue attached to said first retaining member and adapted to be releasably secured to said buckle housing in said retaining position and to contact said valve actuator means.

11. Safety means on a tire changer having a support base for supporting a table for receiving a tire and rim assembly, comprising tire and rim retention means for restraining the tire and rim assembly on the table,
means for fixing said retention means to the support base adjacent one side of the table,
means for detachably connecting said retention means to the support base adjacent the other side of the table, whereby said restraining means is attached to opposing sides of the tire changer disposable between a position retaining a tire and rim on the table and a position remote therefrom, and a tire and rim assembly will be retained on the table if it is overinflated to the point of explosion,
wherein the tire changer includes an air conduit delivering air under pressure to an air chuck for tire inflation, and an inflation valve in the air conduit accessible to an operator, comprising
enabling means actuated by said means for detachably connecting when said retention means is in said retaining position, and
means for locking the inflation valve in a closed position, said enabling means operating to release said means for locking when actuated, whereby air is deliverable to the air chuck.

12. Safety means as in claim 11 wherein said enabling means comprises
switch means, and
a solenoid electrically coupled to said switch means.

13. Safety means as in claim 11 wherein said means for locking comprises
a sliding lock member, and wherein said enabling means comprises
a solenoid operating to move said sliding lock member, and
switch means electrically coupled to said solenoid and accessible to said retention means.

14. Safety means on a tire changer having a support base for supporting a table for receiving a tire and rim assembly, comprising tire and rim retention means for restraining the tire and rim assembly on the table,
means for fixing said retention means to the support base adjacent one side of the table,
means for detachably connecting said retention means to the support base adjacent the other side of the table, whereby said restraining means is attached to opposing sides of the tire changer disposable between a position retaining a tire and rim on the table and a position remote therefrom, and a tire and rim assembly will be retained on the table if it is overinflated to the point of explosion,
wherein said retention means comprises
a rigid arm,
wherein said means for fixing comprises means for pivotally attaching said rigid arm to the tire changer at one end, said arm having a free end disposed for positioning between said retaining position and said remote position,
wherein said means for detachably connecting comprises
a belt attached at one end to said rigid arm and having a free end, and
releasable locking means mounted on the tire changer adapted to couple with said belt free end.

15. Safety means on a tire changer having a support base for supporting a table for receiving a tire and rim assembly, comprising tire and rim retention means for restraining the tire and rim assembly on the table,
means for fixing said retention means to the support base adjacent one side of the table,
means for detachably connecting said retention means to the support base adjacent the other side of the table, whereby said restraining means is attached to opposing sides of the tire changer disposable between a position retaining a tire and rim on the table and a position remote therefrom, and a tire and rim assembly will be retained on the table if it is overinflated to the point of explosion, wherein the tire changer includes an air conduit delivering air under pressure to an air chuck for tire inflation, comprising valve means connected in the air conduit actuable between a closed and open condition, said retention means comprising means for actuating said valve means to said open condition when said retention means is in said retaining position, wherein said means for detachably connecting comprises releasable locking means, said valve means being mounted therein.

16. Safety means on a tire changer having a support base for supporting a table for receiving a tire and rim assembly, comprising tire and rim retention means for restraining the tire and rim assembly on the table, means for fixing said retention means to the support base adjacent one side of the table, means for detachably connecting said retention means to the support base adjacent the other side of the table, whereby said restraining means is attached to opposing sides of the tire changer disposable between a position retaining a tire and rim on the table and a position remote therefrom, and a tire and rim assembly will be retained on the table if it is overinflated to the point of explosion, wherein the tire changer includes an air conduit delivering air under pressure to an air chuck for tire inflation, comprising valve means connected in the air conduit actuable between a closed and open condition, said retention means comprising means for actuating said valve means to said open condition when said retention means is in said retaining position, wherein said means for actuating comprises switch means actuated according to the position of said retention means, and a solenoid valve electrically coupled to said switch means operating to actuate said valve means.

17. Safety apparatus mounted on a tire changer having a support base with an upper surface thereon for securely receiving a wheel rim with a tire to be inflated theron and an air conduit for providing tire inflation air, comprising wheel retention means for restraining a rim and tire on the upper surface, means for fixing said retention means to the support base adjacent one side of the upper surface, means for releasably connecting said retention means to the support base adjacent the other side of the upper surface, whereby said restraining means is attached to opposing sides of the tire changer and is movable between a first position adjacent to the rim receiving surface and spaced therefrom by substantially the rim width and a second position remote from the rim receiving surface, and a normally closed valve means situated in the air conduit actuated to an open condition by said means for releasably connecting when said wheel retention means is in said first position.

18. Safety apparatus as in claim 17 wherein said means for releasably connecting comprises a belt secured at one end to the tire changer support base and having a tongue at the other end, and wherein said wheel retention means comprises a bar assembly, said means for fixing comprising means for pivotally attaching said bar assembly to the tie changer support base at one end and being adapted to receive said tongue at the other end when said bar assembly is in said first position.

19. Safety apparatus as in claim 17 comprising stowing means for retaining said wheel retention means in said second position when not in use.

20. Safety apparatus mounted on a tire changer having a surface thereon for securely receiving a wheel rim with a tire to be inflated thereon and an air conduit for providing tire inflation air, comprising wheel retention means attached to the tire changer and movable between a first position adjacent to the rim receiving surface and spaced therefrom by substantially the rim width and a second position remote from the rim receiving surface, means for releasably locking said wheel retention means in said first position, and a normally closed valve means situated in the air conduit actuated to an open condition by said means for locking when said wheel retention means is in said first position, wherein said means for locking comprises a belt secured at one end to the tire changer and having a tongue at the other end, and wherein said wheel retention means comprises a bar assembly pivotally attached to the tire changer at one end and adapted to receive said tongue at the other end when said bar assembly is in said first position, and wherein said valve means is mounted at said other end of said bar assembly and said tongue operates to actuate said valve means to the open condition when said bar assembly is in the first position.

21. Safety apparatus as in claim 17 wherein said wheel retention means comprises a bar assembly, wherein said means for fixing comprises means for pivotally attaching said bar assembly to the tire changer at one end, said bar assembly having a free end disposed for positioning between said first and second positions, and wherein said means for releasably connecting comprises a belt attached at one end to said free end of said bar assembly and having a belt free end, said means for releasably connecting being mounted on the tire changer support base and being adapted to couple with said belt free end.

22. Safety apparatus mounted on a tire changer having a surface thereon for securely receiving a wheel rim with a tire to be inflated thereon and an air conduit for providing tire inflation air, comprising wheel retention means attached to the tire changer and movable between a first position adjacent to the rim receiving surface and spaced therefrom by substantially the rim width and a second position remote from the rim receiving surface, means for releasably locking said wheel retention means in said first position, and a normally closed valve means situated in the air conduit actuated to an open condition by said means for locking when said wheel retention means is in said first position, wherein said wheel retention means comprises a bar assembly pivotally attached to the tire changer at one end and having a free end disposed for positioning between said first and second positions, and a belt attached at one end to said free end of said bar assembly and having a belt free end, said means for releasably locking being mounted on the tire changer and being adapted to couple with said belt free end, and wherein said normally closed valve means is mounted in said means for releasably locking and is enabled to pass tire inflation air when said belt free end is coupled therewith.

23. Safety apparatus as in claim 22 wherein said valve means comprises a solenoid valve, and a switch electrically coupled to said solenoid valve, said retention means operating to actuate said switch in said first position.

24. Safety apparatus as in claim 22 wherein said means for releasably connecting comprises a buckle, a tongue releasably retained in said buckle, and wherein said valve means comprises a solenoid valve, and switch means electrically coupled to said solenoid valve.

25. A method of safely inflating a vehicle tire on a vehicle rim on a tire changer machine having a tire mounting table supported above a support base and a conduit delivering inflation air from a pressure source to a vehicle tire mounted on the machine, comprising the steps of placing a rim and an associated uninflated tire on the tire changer table, connecting a physical restraint between opposing sides of the support base and overlying the rim and uninflated tire on the tire mounting table, thereby securing the rim and uninflated tire assembly to the table, enabling inflation air passage in the conduit by the step of connecting the physical restraint, and delivering inflation air thereafter at will through the conduit.

26. The method of claim 25 wherein the tire changer has a normally closed manually actuated inflation air valve in the conduit and a lock for preventing manual actuation thereof, and wherein the step of enabling comprises the step of unlocking the lock for the manually actuated inflation air valve.

* * * * *